Patented July 6, 1954

2,683,167

UNITED STATES PATENT OFFICE 2,683,167

DIAMMONIUM COMPOUNDS

Emil Girod, Riehen, near Basel, and Franz Häfliger, Basel, Switzerland, assignors to J. R. Geigy A. G., Basel, Switzerland, a Swiss firm No Drawing. Application August 29, 1952,
Serial No. 307,162

Claims priority, application Switzerland
September 5, 1951

2 Claims. (Cl. 260—482)

This invention concerns new quaternary diammonium compounds of the general formula:

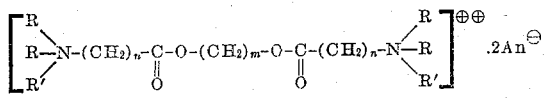

wherein

 represents a lower dialkylamino radical, a lower alkyleneimino radical with 5-6 ring members such as the pyrrolidino, piperidino or 2-methyl-piperidino, or the morpholino radical, R' represents a lower alkyl radical, An$^\ominus$ represents a monovalent anion or a normal equivalent of a polyvalent anion, $m$ represents a whole integer from 6 to 14, and
$n$ represents a whole integer from 1 to 4

It has now been found that these compounds have an interesting pharmacological action, e. g. on the tonus of the muscles, above all, a paralysing effect. For example, 2800$\gamma$ of the di-iodide of 1.10-bis-($\alpha$-triethylammonium-acetoxy)-decane has the same activity on the isolated diaphragm of the rat according to Buelbring Trevan as 100$\gamma$ d-tubocurarine.

The new diammonium compounds can be produced by reacting $\alpha.\omega.$-bis-(halogen alkanoyloxy)-alkanes of the general formula:

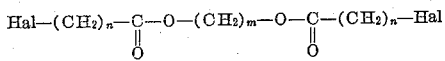

with 2 mols of secondary amines of the general formula:

and then treating the ditertiary $\alpha.\omega.$-bis-(aminoalkanoyloxy)-alkanes so obtained of the general formula:

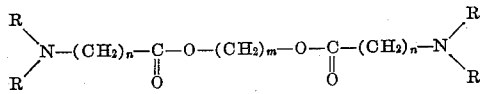

with alkylating agents of the general formula:

R'—An' and finally, if desired, replacing the anion An'$^\ominus$ by a different anion An$^\ominus$.

In the above formulae Hal represents chlorine, bromine or iodine and An' represents chlorine, bromine, iodine,

—O—SO$_2$—OCH$_3$, —O—SO$_2$—OC$_2$H$_5$, or —O—SO$_2$-aryl, while R, An, $m$ and $n$ have the meanings given above.

Some of the new diammonium compounds can also be produced by reacting the $\alpha.\omega.$-bis-(halogen-alkanoyloxy)-alkanes already mentioned of the general formula:

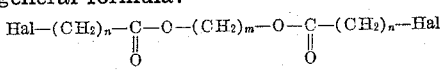

directly with two mols of tertiary amines of the general formula:

in which formulae Hal,

R', $m$ and $n$ have the meanings given above. Diammonium compounds of the general formula:

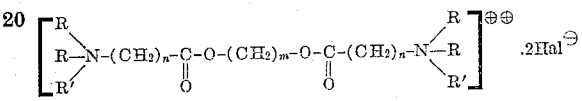

are thus obtained.

In most cases when producing the diquaternary compounds, it is generally advantageous to heat in order to obtain a complete reaction. It is also advantageous to react the $\alpha.\omega.$-bis-(halogenalkanoyloxy)-alkanes with the secondary amines while heating. The reactions can be performed in the presence or absence of solvents; as such, acetone, butanone, acetic acid ester, benzene, toluene, xylene, ether, dioxan, methanol or abs. ethanol for example, come into question.

As starting products, e. g. $\alpha.\omega.$-bis-chloracetoxy, $\alpha.\omega.$-bis-bromacetoxy-, $\alpha.\omega.$-bis-iodacetoxyhexane, -heptane, -octane, -nonane, -decane, -undecane, -dodecane, -tridecane and -tetradecane, and also $\alpha.\omega.$-di-($\beta'$-bromo- or $\beta'$-chloropropionyloxy), $\alpha.\omega.$-di-($\gamma'$-bromo- or $\gamma'$-chlorobutyryloxy)-, and $\alpha.\omega.$-di-($\delta'$-bromo- or $\delta'$-chlorovaleryloxy)-hexane, -heptane, -octane, -nonane, -decane, -dodecane and -tetradecane come into question. These compounds can be reacted with for example, dimethylamine, methylethylamine, methylpropylamine, methylisopropylamine, methylallylamine, methylbutylamine, methylisobutylamine, methylamylamine, diethylamine, ethylpropylamine, ethylbutylamine, ethylamylamine, dipropylamine, di-isopropylamine, diallylamine, dibutylamines and diamylamines, piperidine, morpholine, pyrrolidine, 2-methylpiperidine, or trimethylamine, methyl-diethylamine, triethylamine or 1-methyl-piperidine.

In particular, alkyl halides such as methyl iodide, methyl bromide, ethyl iodide, ethyl bromide, ethyl chloride, propyl iodide, propyl bromide, isopropyl bromide, allyl iodide, butyl bromide, isobutyl bromide and amyl bromide and also sulphuric acid esters such as dimethyl sulphate and diethyl sulphate come into question as alkylating agents. In general, iodine compounds react the most easily and the most difficult to react are chlorine compounds. However, quaternary ammonium iodides or bromides can be converted into quaternary ammonium chlorides by means of silver chloride. If necessary the reactions can be performed in pressure vessels.

The following example serves to further illustrate the invention. Parts are given as parts by weight, preferably in grammes and the relationship of parts by weight to parts by volume is as that of grammes to cubic centimetres. The temperatures are given in degrees centigrade.

EXAMPLE (a) *1.10-di-(chloracetoxy)-decane*

27 parts of freshly distilled chloracetyl chloride are added dropwise while stirring to a mixture of 17.4 parts of 1.10-decane diol, 100 parts by volume of abs. benzene and 20 parts by volume of abs. pyridine during which the temperature is kept under 20° by cooling with ice and water. The whole is stirred for 14 hours at room temperature, ether is added and the ether solution after separation is washed several times with water. After drying with sodium sulphate, the ether is distilled off and the residue is fractionated in the high vacuum. The 1.10-di-(chloracetoxy)-decane desired passes over at 160–164° under 0.05 mm. pressure. It crystallises on standing.

(b) *1.10-bis-(α-diethylamino-acetoxy)-decane*

13.1 parts of this 1.10-di-chloracetoxy decane are mixed with 50 parts by volume of abs. benzene and 16 parts of diethylamine and the whole is heated at 100° for 14 hours in a closed vessel. After cooling, so much 2 N hydrochloric acid is stirred in to give the aqueous portion a weakly acid reaction to Congo red. The aqueous portion is separated and shaken out several times with ether and then excess 30% caustic soda lye is carefully added while cooling with ice. The base which precipitates is immediately taken up in ether. After drying with potassium carbonate, the ether is distilled off and then all other volatile components are removed under 12 mm. pressure by placing the flask in a boiling water bath. The raw base which remains is treated with active charcoal which is then filtered off.

(c) *Di-iodide of 1.10-bis-(α-triethylammonium-acetoxy)-decane*

4.0 parts of this 1.10-bis-(α-diethylamino-acetoxy)-decane are dissolved in 15 parts of dry acetone and boiled under reflux for about 14 hours with 3 parts by volume of ethyl iodide. After it has cooled, ethyl acetate is carefully added to the solution so that it remains clear at room temperature whereupon the temperature is reduced to —10° until crystallisation occurs. The quaternary salt is drawn off under suction, washed with a mixture of acetone and abs. ether and dried at 50–60° under reduced pressure. The di-iodide of 1.10-bis-(α-triethylammonium-acetoxy)-decane is somewhat hygroscopic; it melts at 145–148°.

Also the following salts for example can be produced in an analogous manner:

Dibromide of 1.10 - bis - (α - triethylammonium-acetoxy)-decane,
Di-iodide of 1.6 - bis - (α - triethylammonium-acetoxy)-hexane,
Di-iodide of 1.6 - bis - (δ - trimethylammonium-valeroxy)-hexane,
Di-iodide of 1.7 - bis - (β - triethylammonium-propionyloxy)-heptane,
Dibromide of 1.8 - bis - (α - butyldimethylammonium-acetoxy)-octane,
Di-iodide of 1.8 - bis - (γ - trimethylammonium-butyroxy)-octane,
Di-iodide of 1.9 - bis - (α - triethylammonium-acetoxy)-nonane,
Dibromide of 1.10 - bis - (α - butyldimethylammonium-acetoxy)-decane,
Di-iodide of 1.10 - bis - (α - trimethylammonium-acetoxy)-decane,
Di-iodide of 1.10 - bis - (ethyldimethylammonium-acetoxy)-decane,
Di-iodide of 1.10 - bis - [α - (N - methyl - piperidinium)-acetoxy]-decane,
Di-iodide of 1.10 - bis - [α - (N - methyl - morpholinium)-acetoxy]-decane,
Di-iodide of 1.10 - bis - (β - triethylammonium-propionyloxy)-decane,
Dibromide of 1.10 - bis - (β - dimethylbutylammonium-propionyloxy)-decane,
Di-iodide of 1.10 - [β - (N - methyl - piperidinium)-propionyloxy]-decane,
Di-iodide of 1.10 - [β - (N - methyl - pyrrolidinium)-propionyloxy]-decane,
Di-iodide of 1.10 - bis - (γ - trimethylammonium-butyroxy)-decane,
Di-iodide of 1.11 - bis - (α - trimethylammonium-acetoxy)-undecane,
Di-iodide of 1.11 - bis - (α - ethyldimethylammonium-acetoxy)-undecane,
Di-iodide of 1.12 - bis - (α - triethylammonium-acetoxy)-dodecane,
Di-iodide of 1.12 - bis - (β - trimethylammonium-propionyloxy-dodecane,
Di-iodide of 1.12 - bis - (α - methyl - diethylammonium-acetoxy)-dodecane,
Di-iodide of 1.13 - bis - (trimethylammonium-acetoxy)-tridecane,
Di-iodide of 1.14 - bis - (trimethylammonium-acetoxy)-tetradecane.

What we claim is:

1. The diammonium compounds of the formula:

$$\left[ \begin{array}{c} R \\ R-N-CH_2-C-O-(CH_2)_{10}-O-C-CH_2-N-R \\ R' \phantom{aaaa} \| \phantom{aaaaaaaaaaaaa} \| \phantom{aaaa} R' \\ \phantom{aaaaaaa} O \phantom{aaaaaaaaaaaa} O \end{array} \right]^{\oplus\oplus} .2\mathrm{Hal}^{\ominus}$$

wherein $\diagup R \atop N \diagdown R$ represents a lower dialkylamino radical, R' represents a lower alkyl radical and Hal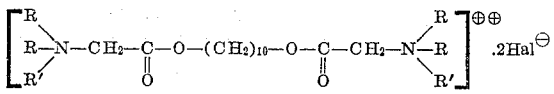 represents a halogen ion.

2. The di-iodide of 1.10-bis-(α-triethylammonium-acetoxy)-decane.

No references cited.